United States Patent
Cherian et al.

(10) Patent No.: US 8,644,280 B2
(45) Date of Patent: Feb. 4, 2014

(54) METHOD OF ESTABLISHING AN HRPD SIGNAL LINK

(75) Inventors: George Cherian, San Diego, CA (US); Poornima A. Lalwaney, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 258 days.

(21) Appl. No.: 13/190,626

(22) Filed: Jul. 26, 2011

(65) Prior Publication Data

US 2011/0280191 A1 Nov. 17, 2011

Related U.S. Application Data

(62) Division of application No. 11/778,746, filed on Jul. 17, 2007, now Pat. No. 8,009,612.

(51) Int. Cl.
| | |
|---|---|
| *H04W 4/00* | (2009.01) |
| *H04W 24/00* | (2009.01) |
| *H04L 12/66* | (2006.01) |
| *H04L 12/28* | (2006.01) |
| *H04B 1/00* | (2006.01) |

(52) U.S. Cl.
USPC ........... 370/338; 370/331; 370/352; 370/332; 370/401; 370/256; 455/437; 455/69; 455/221

(58) Field of Classification Search
USPC .......................................................... 370/328
See application file for complete search history.

(56) References Cited

U.S. PATENT DOCUMENTS

| | | | |
|---|---|---|---|
| 5,432,843 | A | 7/1995 | Bonta |
| 7,089,009 | B1 | 8/2006 | Fauconnier |

(Continued)

FOREIGN PATENT DOCUMENTS

| | | |
|---|---|---|
| EP | 2019564 A1 | 1/2009 |
| WO | 0241509 A2 | 5/2002 |

(Continued)

OTHER PUBLICATIONS

3GPP, "Circuit Services Notification Application Specification for cdma2000 High Rate Packet Data", 3GPP2 C.S0082-0 Version 1.0, Aug. 2006.

(Continued)

*Primary Examiner* — Timothy Pham
(74) *Attorney, Agent, or Firm* — Gary J. Cunningham

(57) ABSTRACT

A method (10) of establishing an alternate HRPD signaling link between and HRPD access network and an access terminal over a non-HRPD access is disclosed. It includes: providing (12) a signal forwarding function (SFF) (22) between an access terminal (AT) (24) and a high rate packet data (HRPD) access network (AN) (26); establishing (14) a data tunnel (28) between the access terminal (24) and the SFF (22); exchanging (16) HRPD signaling messages and HRPD data via the data tunnel (28); identifying (18) the HRPD access network (26) and the access terminal (24) over non-HRPD access by the SFF (22), by reading a header with certain identifiers and mapping the header to an address of the access terminal or network; and forwarding (20) the HRPD signaling messages and the HRPD data that arrive at the SFF (22) from the access terminal (24) and the HRPD access network (26) to the HRPD access network (26) and the access terminal (24), respectively. The method (10) performs an initiation and session establishment procedure, minimizes the time, disruption and packet loss during handoff to a HRPD access network and enables seamless mobility.

11 Claims, 17 Drawing Sheets

(56) References Cited

U.S. PATENT DOCUMENTS

| | | |
|---|---|---|
| 7,379,739 B2 | 5/2008 | Rajkotia et al. |
| 2003/0119514 A1 | 6/2003 | Needham |
| 2005/0266842 A1 | 12/2005 | Nasielski et al. |
| 2006/0003767 A1 | 1/2006 | Kim et al. |
| 2006/0072506 A1* | 4/2006 | Sayeedi et al. ............ 370/331 |
| 2006/0099949 A1 | 5/2006 | Jung et al. |
| 2006/0109817 A1 | 5/2006 | Ramanna et al. |
| 2006/0109818 A1* | 5/2006 | Ramanna et al. ............ 370/331 |
| 2006/0121901 A1 | 6/2006 | Tanaka |
| 2006/0126564 A1 | 6/2006 | Ramanna et al. |
| 2006/0187877 A1 | 8/2006 | Lundby et al. |
| 2006/0203845 A1 | 9/2006 | Monogioudis |
| 2006/0239227 A1* | 10/2006 | Han et al. ............ 370/331 |
| 2006/0248361 A1 | 11/2006 | Fung |
| 2006/0274692 A1 | 12/2006 | Ryu |
| 2007/0153769 A1 | 7/2007 | Comstock et al. |
| 2007/0202866 A1 | 8/2007 | Tsuchiya |
| 2008/0225797 A1 | 9/2008 | Kim |
| 2008/0259869 A1 | 10/2008 | Wang et al. |
| 2009/0186611 A1 | 7/2009 | Stiles et al. |
| 2010/0046477 A1 | 2/2010 | Marin et al. |

FOREIGN PATENT DOCUMENTS

| | | |
|---|---|---|
| WO | 2004073322 A2 | 8/2004 |
| WO | 2006117587 A1 | 11/2006 |
| WO | 2007007914 A2 | 1/2007 |
| WO | 2008038949 A1 | 4/2008 |

OTHER PUBLICATIONS

3GPP, "Technical Specification Group Radio Access Network; Network Assisted Cell Change (NACC) From UTRAN to GERAN; Network Side Aspects (Release 6)", 3GPP TR 25.901 Version 6.1.0, Sep. 2004, Valbonne, France.

Patent Cooperation Treaty, "PCT Search Report and Written Opinion of the International Searching Authority" for International Application No. PCT/US2009/052532 Aug. 3, 2009, 17 pages.

Y.H. Cho et al.; "Intelligent Mobile IPv6 Handover with Multiple Pre-Registration and Late Tunneling"; Conference on Communication Systems Software and Middleware and Workshops; Jan. 6, 2008; pp. 551-554; XP002556342.

3GPP TS 43.318 V10.1.0 (Mar. 2011), 3rd Generation Partnership Project; Technical Specification Group GSM/EDGE Radio Access Network; Generic Access Network (GAN); Stage 2, (Release 10), all pages.

United States Patent and Trademark Office, Non-Final Office Action, U.S. Appl. No. 12/194,120, dated Aug. 9, 2012, 18 pages.

United States Patent and Trademark Office, Non-Final Office Action, U.S. Appl. No. 12/194,120, dated Feb. 27, 2013, 20 pages.

United States Patent and Trademark Office, Non-Final Office Action, U.S. Appl. No. 12/194,120, dated Jun. 10, 2013, 23 pages.

Federal Service on Industrial Property, "Official Action of substantive examination" for Russian Patent Application No. 2010113450/07 dated Jul. 23, 2013, 5 pages.

3GPP TS 23.402 V8.0.0 (Dec. 2007) 3rd Generation Partnership Project; Technical Specification Group Services and System Aspects; Architecture enhancements for non-3GPP accesses; (Release 8), 131 pages.

3GPP TSG SA WG2 Meeting#63 "Handover with Network Discovery and Selection", Motorola, Athens, Greece, Aug. 2, 2008, 2 pages.

L. M. Nevdyaev "3rd Generation Mobile Communication", Series "Communication and Business", Moscow 2000, pp. 110-111.

* cited by examiner

PROTOCOL STRUCTURE AS DEFINED BY HRPD STANDARD (IS856) AND THE DEFAULT SIGNALING PATH (HIGHLIGHTED WITH BLOCK LINES)

PROTOCOL STRUCTURE WITH THE NEWLY DEFINED SIGNALING ADAPTATION PROTOCOL, AND THE NEWLY DATA/ SIGNALING-PATH THROUGH SIGNALING ADAPTATION PROTOCOL

OPTION-1 SIGNALING ADAPTATION PROTOCOL CARRYING
SNP PACKETS AND RLP PACKETS

OPTION-2 SIGNALING ADAPTATION PROTOCOL CARRYING
SLP-D PACKETS AND RLP PACKETS

OPTION-3 SIGNALING ADAPTATION PROTOCOL CARRYING STREAM PACKETS

SIGNALING ADAPTATION PROTOCOL: ESTABLISHMENT OF SIGNALING OVER ALTERNATE LINK

METHOD OF ESTABLISHING AN HRPD SIGNAL LINK

BACKGROUND OF THE INVENTION

1. Field of the Invention

The present invention relates to a method of establishing an HRPD signal link, and more particularly to a method of establishing an alternate HRPD signaling link between the access terminal and the access network over a non-HRPD access and the pre-establishment of HRPD sessions over the alternate signaling link.

2. Description of the Related Art

There is interest in developing multi-mode devices, capable of seamlessly transferring data, voice and video services from one radio technology to another one, without adversely affecting the user-experience.

One such device is 3GPP2-EVDO interoperating with other wireless standards, such as 3GPP Long Term Evolution (LTE), WLAN, WiMax, etc. This type of inter-technology handoffs is gaining special attention, as there is keen interest in integrating different air-interface technologies. Also as major cellular operators migrate to 4G and newer operators in broadband space emerge, multi-mode radio devices will be needed for both intra-operator as well as inter operator roaming for the foreseeable future as 4G technologies mature.

A real-time data-session, for example, a VoIP call, that is initiated on one technology, such as LTE, may move or roam into an area where only HRPD is available. It becomes necessary to transfer the VoIP call from LTE to HRPD seamlessly and without a long delay.

However, the HRPD requires that a session is established, before it is allowed to make/receive any type of calls. The initialization and session establishment of HRPD includes the following steps, which requires signaling exchanges between a mobile device and the HRPD network: 1. Unicast Access Terminal Identifier (UATI) assignment procedure, 2. HRPD session establishment procedure, 3. Access Authentication, 4. Point-to-point protocol (PPP) set-up, and 5. IP-setup as a preparation for a future handoff to HRPD. However, the complexity and cost constraints limit the mobile device to have typically, one transmitter antenna, which is standard industry practice today.

In the example detailed above, this would require that there is an additional transmitter available for signaling exchanges for initialization and session establishment, while the device is actively transmitting and receiving on the other radio-interface.

This invention proposes a method and solution to perform the initialization and session-establishment procedure of HRPD, from a mobile active on a non-HRPD network or other air-interface, such as LTE, WLAN, WiMax, etc., so as to minimize the disruption and packet loss during handoff or transfer to HRPD network, free of having to use two transmitter antennas.

Thus, there is a need to perform the initialization and session-establishment procedure of HRPD, from a mobile active on a non-HRPD air-interface (by way of example, this term includes LTE, WLAN, WiMax and the like), so as to minimize the disruption and packet loss during handoff or transfer to the HRPD air-interface, which is cost effective, quick or user friendly and free from requiring use of two transmitter antennas, for example.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 1:
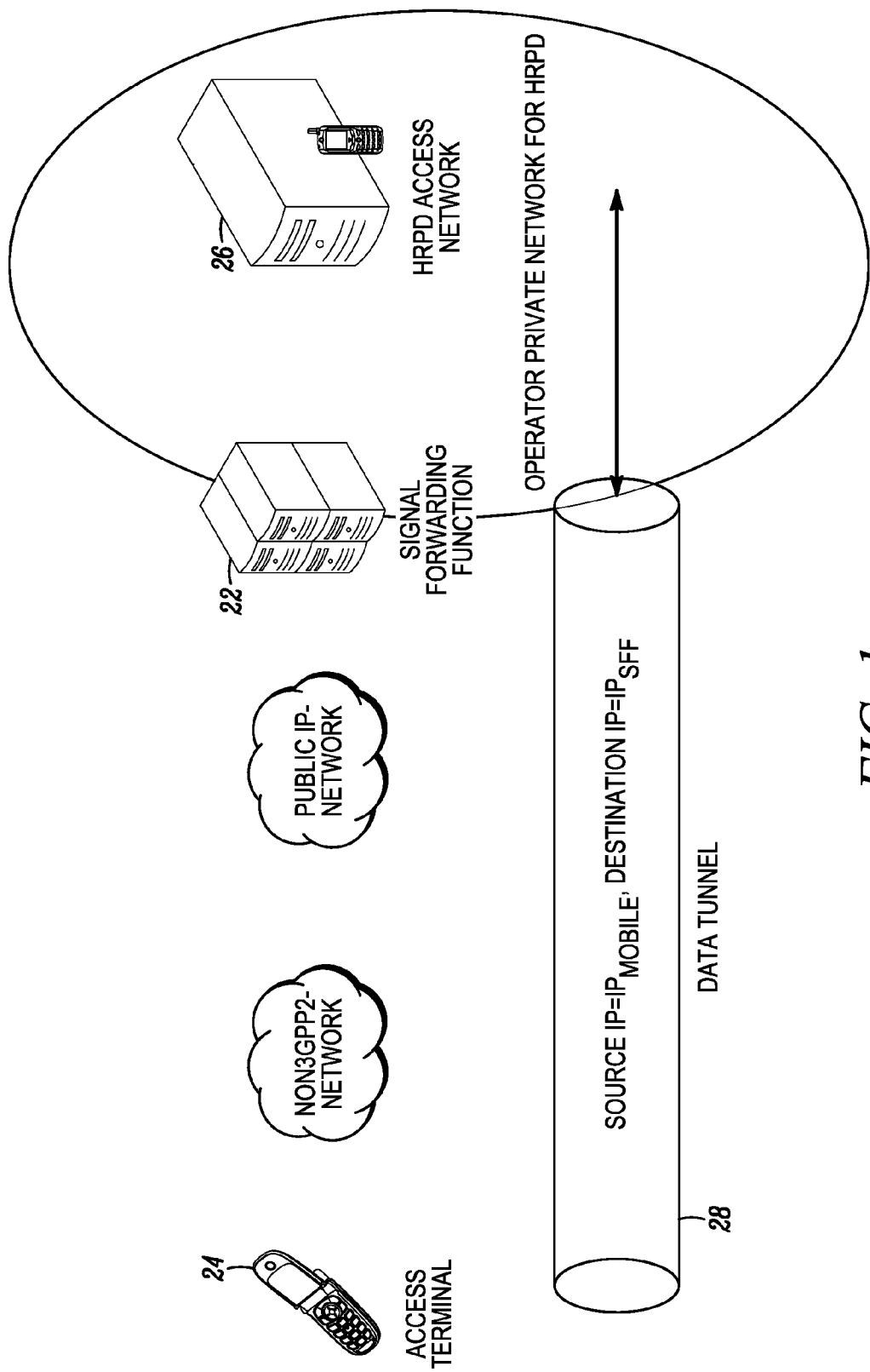
FIG. 1 is a simplified illustration of HRPD signaling on a non-HRPD access, in accordance with the invention.
Figure 2:
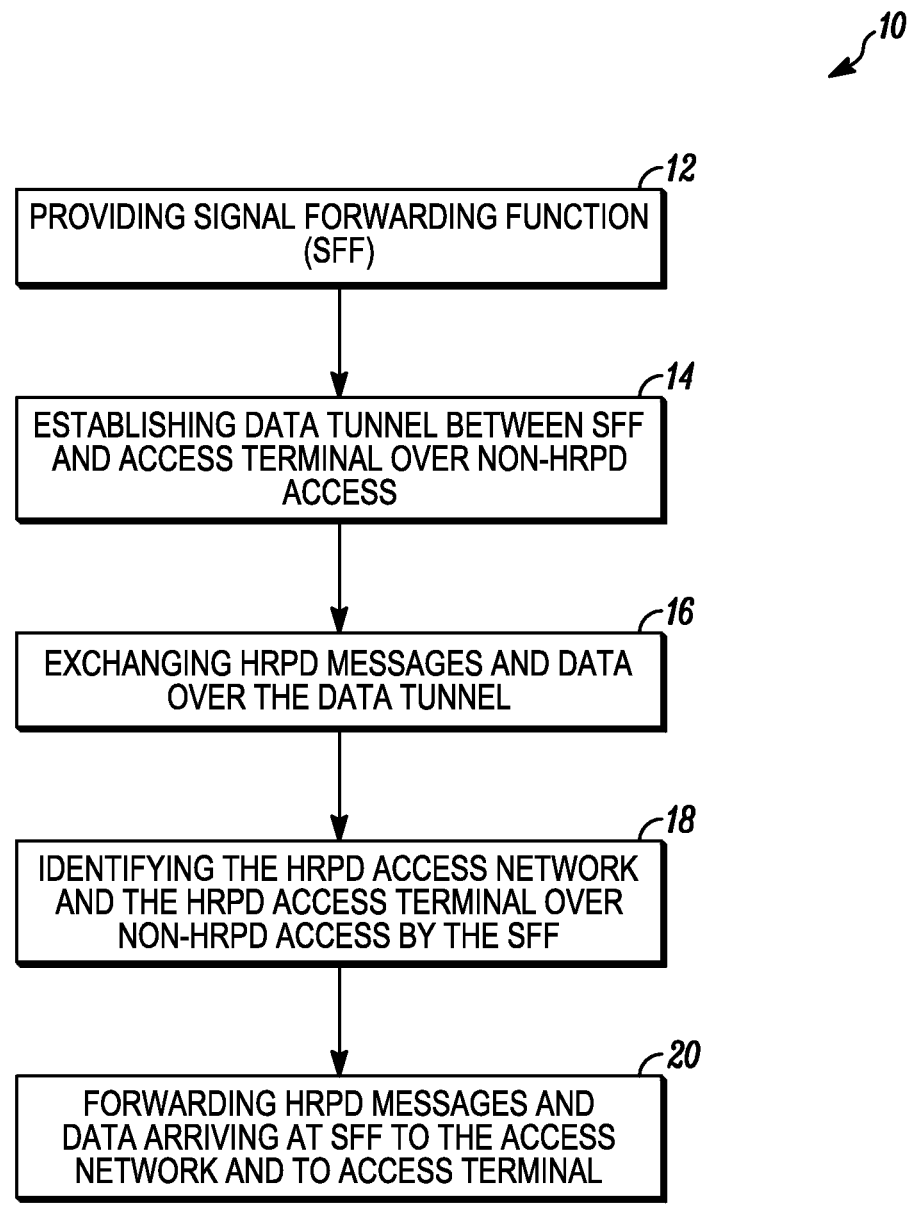
FIG. 2 is a block diagram for a method of establishing an HRPD signal link over a non-HRPD access, in accordance with the invention.

Referring to FIGS. 1 and 2, a method 10 of establishing an alternate HRPD signaling link between an HRPD access network and an access terminal over a non-HRPD access, is shown. The method 10 generally includes a providing step 12, an establishing step 14, an exchanging step 16, an identifying step 18 and a forwarding step 20. In more detail, the method 10 includes: providing 12 a signal forwarding function (SFF) 22 between an access terminal (AT) 24 and a high rate packet data (HRPD) access network (AN) 26; establishing 14 a data tunnel 28 between the access terminal 24 and the SFF 22; exchanging 16 HRPD signaling messages and HRPD data via the data tunnel 28; identifying 18 the HRPD access network 26 and the access terminal 24 over non-HRPD access by the SFF 22, by reading a header comprising HRPD sector identification, access terminal identification and stream identification and mapping the header to an address of one of the access terminal and the access network; and forwarding 20 the HRPD signaling messages and the HRPD data that arrive at the SFF 22 from the access terminal 24 and the HRPD access network 26 to the HRPD access network 26 and the access terminal 24, respectively. Advantageously, the method 10 performs an initiation and session establishment procedure, minimizes the time, disruption and packet loss during handoff to a HRPD access network and enables seamless mobility.

In more detail, the method 10 performs the initiation and session establishment procedure for HRPD. For example, in use an AT 24, such as a mobile, would by active on a non-HRPD access (such as 3GPP Long Term Evolution (LTE), wireless local area network (WLAN), and WIMax). The method 10 is adapted to minimize the time, disruption and packet loss during handoff to a HRPD access network and maximize user's experiences. In one embodiment, the HRPD signaling messages are over a TCP/IP link, with a newly defined header to uniquely identify the HRPD Access Network. In addition, the method 10 is particularly adapted for use in multi-mode devices or access terminals, with HRPD as one of the access technologies. Stated another way, the method 10 provides seamless mobility between HRPD and non-HRPD air-interface technologies.

Detailed below and throughout this application are brief definitions of the terms and acronyms used. All such terms and acronyms have their common ordinary meanings, unless explicitly stated to the contrary. The definitions herein are an attempt at clarity.

1. Evolution-Data Optimized or Evolution-Data are abbreviated as EV-DO or EVDO or 1xEV.
2. High Data Rate (HDR) and High Rate Packet Data (HRPD) generically refer to telecommunications standards for the wireless transmission of data through radio signals. HRPD can provide for broadband Internet access and various data services including real time data services like Voice Over Internet Protocol (VoIP).
3. EVDO employs multiplexing techniques such as CDMA (Code division multiple access) as well as Frequency division duplex (FDD) to maximize the amount of data transmitted. It is standardized by the 3rd Generation Partnership Project 2 (3GPP2), as part of the CDMA2000 family of standards and has been adopted by many mobile phone service providers around the world, and particularly those previously employing CDMA networks. A more detailed description of the CDMA2000 High Rate Packet Data (HRPD) EVDO (Evolution Data Optimized) is provided in 3GPP2 C.S0024-A, entitled "cdma2000 High Rate Packet Data Air Interface Specification", September 2006, and in TIA-IS-856 (also known as IS856).
4. An HRPD session refers to a shared state between an access terminal (AT) and the access network (AN). Other than to open a session, the AT cannot communicate with the AN without having an open session.
5. A connection or dedicated radio connection, refers to a particular state of an air-link in which the AT is assigned a forward traffic channel, a reverse traffic channel and associated medium access control channels.
6. As used herein, the HRPD acronym generically refers to and includes, by way of example, HDR, EV-DO, EVDO, 1xEV, CDMA, CDMA2000 Evolution Data Optimized (EVDO), standards TIA-IS-856, 3GPP2 HRPD interoperability specification A.S0008, cdma2000 wireless IP network based standard TIA-IS-835 and the like.
7. 3G refers to Third Generation Cellular Technology
8. 3GPP refers to Third Generation Partnership Project, a standardization group that develops GSM standards and its evolution
9. 3GPP2 refers to a Third Generation Partnership Project 2, a standardization group that develops cdma2000 development
10. 4G refers to Fourth Generation broadband wireless technology
11. WiMAX means Worldwide Interoperability for Microwave Access
12. TCP means Transmission Control Protocol (a part of TCP/IP)
13. IP is Internet Protocol (a part of TCP/IP)

In one embodiment, the method 20 includes pre-establishing an HRPD session over a non-HRPD access prior to establishing a traffic channel on an HRPD air-interface. In order to perform a handoff between non-HRPD access and HRPD access, it is required that an HRPD session be established before the handoff (at a suitable radio-frequency). A problem in real time services like Voice over IP (VoIP) is that the HRPD session establishment takes a period of time, in the order of seconds, which can introduce an unacceptable break in communication. In order to support low latency (low set up time) active session handoffs between non-HRPD and HRPD access, the method 20 provides a solution and effective procedures, to pre-establish the HRPD session, while on the non-HRPD access, before the radio frequency antenna switches from non-HRPD access to HRPD access.

The term HRPD access as used herein, includes at least one of HRPD air-interface, HRPD access network, wherein access network includes a radio network controller, base station(s) and the like and HRPD core-network, wherein the core-network includes Packet Data Service Network (PDSN), Mobile IP Home agent, Mobile IP foreign agent and the like and the term non-HRPD access as used herein, includes at least one of non-HRPD air-interface, non-HRPD access network and non-HRPD core-network.

In one embodiment, the method 20 includes authenticating and pre-establishing an HRPD session from a HRPD multi-mode access terminal, (wherein the HRPD multi-mode access terminal is a mobile device, which implements one or more than one access technology in addition to HRPD access technology) active on a non-HRPD access, prior to establishing a traffic channel on an HRPD air-interface. Preferably, this includes obtaining UATI assignment, protocol subtype negotiation and protocol configuration parameters negotiation of all protocol layers of HRPD, prior to establishing a traffic channel. In order to perform an active session handoff between non-HRPD and HRPD, it may be required that access terminal obtain UATI from the access network by means of UATI assignment, negotiate the protocol subtypes and protocol configuration parameters between the HRPD access network and the access terminal. However, these procedures can take an unacceptable period of time (negative user experience) and can cause an unacceptable break in communication, in known real time services like VoIP. As used above, active session means the access terminal is sending and receiving user data on a dedicated radio connection.

Advantageously, in order to support low latency (break in communication reduced to a minimum) active session handoff between non-HRPD and HRPD access, the method includes establishing effective procedures to obtain the HRPD UATI, HRPD protocol subtypes and configuration parameters while on the non-HRPD access, before the radio frequency antenna switches from non-HRPD access to the HRPD access In one embodiment, the data tunnel in FIG. 1, is secure in order to minimize the possibility of a security attack on the access network as well as to protect the privacy of the access terminal.

In another embodiment, the method includes the step of allowing HRPD access channel messaging from and to a non-HRPD air-interface access terminal. This feature can reduce the time it takes to perform a handoff from a non-HRPD network to a HRPD network, for example. In this embodiment, it is desirable that the access procedures that are required on HRPD to obtain HRPD traffic channel be bypassed, thus advantageously improving the user experience during handoff.

As should be understood by those skilled in the art, an access network can include a base station controller, radio network controller, a plurality of the preceding and the like. It is understood that, a base station provides a Radio Frequency (RF) interface between an access terminal and an access network via one or more transceivers. An access network exchanges the signaling messages with a HRPD access terminal in order to establish the session, maintenance of session and so on.

In yet another embodiment, the method can include: providing an interface between the access terminal and SFF; and providing an interface between the SFF and access network. In this embodiment, the SFF can be defined as a stand alone module or feature, in order to ease the access network implementation and the scalability based on access network loading and operator network layout. Advantageously, the interface between the Access Terminal and SFF, can support interoperability between different access terminal vendors and SFF vendors. Likewise, the interface defined as being between the SFF and HRPD access network provides and supports interoperability between different HRPD access network vendors and SFF vendors.

In a preferred embodiment, the method includes: mapping of the HRPD access terminal identification to the IP address assigned by the non-HRPD network. In order to keep the non-HRPD network free of having to process the HRPD specific information, it is important to use a generic transport mechanism over the data tunnel established between the access terminal and the SFF, and TCP/IP provides such an option. It is necessary that the identification used for identifying the access terminal in the HRPD access be mapped to the TCP/IP domain, where IP addresses are used. This feature enables this function.

Also in a preferred embodiment, the method includes routing encapsulated messages by SFF over IP by mapping SectorID to the IP address of the HRPD access network. The HRPD signaling messages that arrive at the SFF, from the access terminal need to be forwarded to the HRPD access network, and the HRPD signaling messages that arrive at the SFF from the access network need to be forwarded to the access terminal. However, having one SFF for every HRPD access network is impractical. It is desirable to have one SFF serve many HRPD access networks. This feature maps the Identity of the HRPD network, which is identified by the SectorID uniquely to an IP address of the HRPD network that is reachable within the access network.

Figure 3:
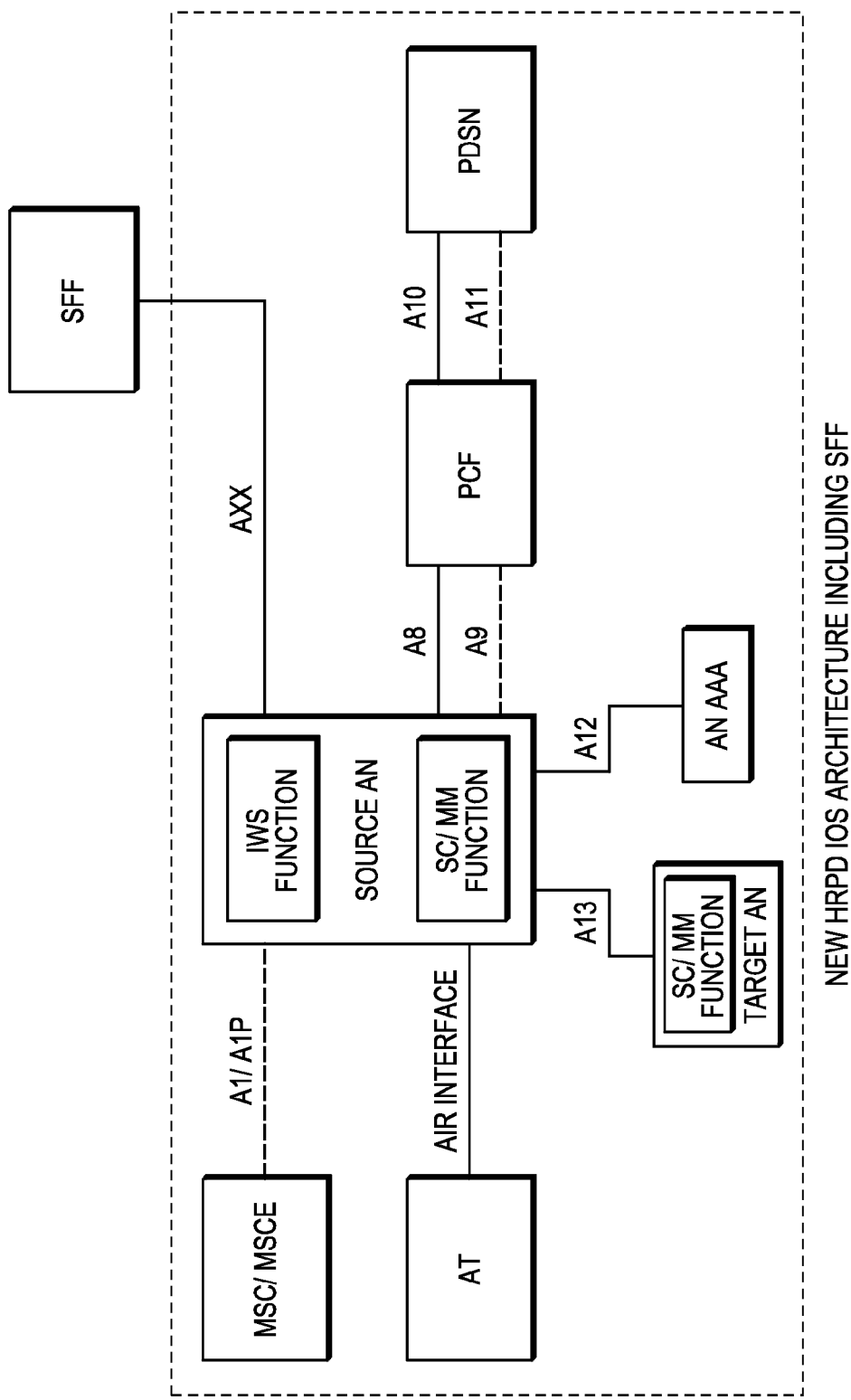
FIG. 3 illustrates a HRPD IOS Architecture, as defined in the HRPD IOS standard for 3GPP2, A.S0008 in phantom, including a Signal Forwarding Function and a new interface (Axx), in accordance with the invention.

Referring to FIG. 3, this figure illustrates a HRPD IOS Architecture, as defined in the HRPD IOS standard for 3GPP2, A.S0008 in phantom, which is incorporated herein by reference. FIG. 3 also includes a Signal Forwarding Function. Advantageously, the SFF in the context of this figure and application provides quick and reliable handoffs between HRPD and non-HRPD, as well as a cost effective solution. In more detail, in order to pre-establish a HRPD session (by exchanging the HRPD signaling messages and data over a non-HRPD access), it is necessary that an alternate path is defined. The method and SFF provide: an alternate path such that the non-HRPD access does not have to process the HRPD specific information and the TCP/IP on a data tunnel over non-HRPD; HRPD signaling messages that are sent on TCP/IP over a non-HRPD, be routed to the right access network and access terminal; and translation from a TCP/IP domain to HRPD domain; and security to protect the access network from attack.

Figure 4:
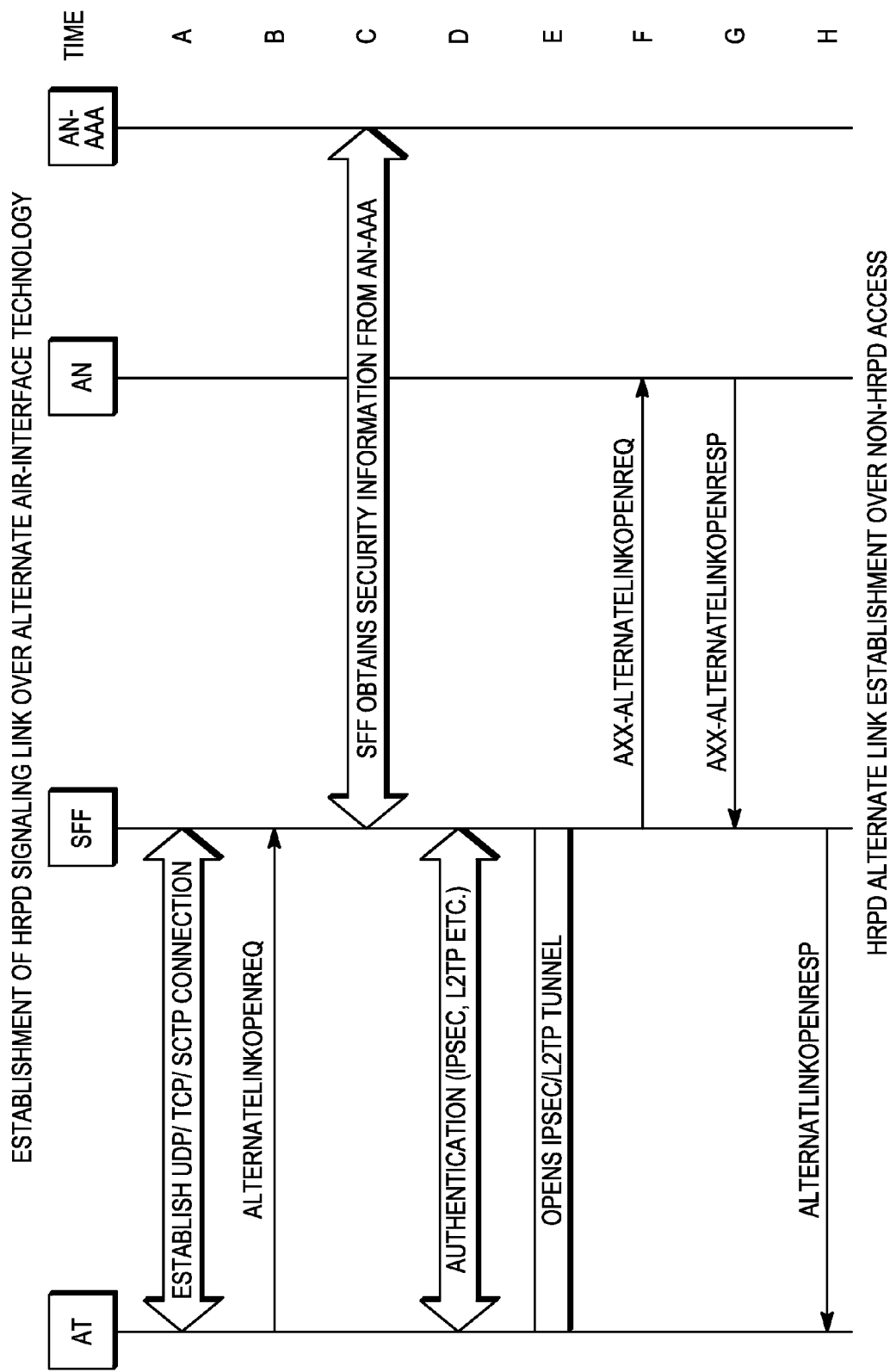
FIG. 4 is a flow diagram for establishing an HRPD signal link over a non-HRPD access over time, the diagram includes columns for each of the Access Terminal (AT), Signal Forwarding Function (SFF), Access Network (AN), Access Network-AAA (AN-AAA) and times a-h, illustrating how a link is opened or established, in accordance with the invention.

FIG. 4 is a flow diagram for establishing an HRPD signal link over a non-HRPD air-interface over time, the diagram includes columns for each of the Access Terminal (AT), Signal Forwarding Function (SFF), Access Network (AN), Access Network-AAA (AN-AAA) and times a-h, illustrating how a link is opened.

In more detail, items a through h provide a detailed flow over time and in sequence. At time a, the AT establishes an IP connection. The IP connection is established over a non-EVDO air interface. At time b, the AT sends AlternateLinkOpenReq message over the IP bearer to Signal Forwarding Function. The AlternateLinkOpenReq message contains the identity of the mobile station. At time c, the Signal Forwarding Function, upon getting the AlternateLinkOpenReq message obtains the Access Terminal credentials from the AN-AAA. At time d, the Signal Forwarding Function, triggers authentication of the mobile, in order to establish a secure data tunnel between Access Terminal and the Signal Forwarding Function. At time e, a secure data tunnel is created between the Signal Forwarding Function and the Access Terminal. At time f, a Signal Forwarding Function, sends the Axx-AlternateLinkOpenReq message to Access Network. At time g, the Access Network responds back to Signal Forwarding Function, with an Axx-AlternateLinkOpenResp message. At item h, the Signal Forwarding Function forwards an AlternateLinkOpenResp message to the Access Terminal. Advantages, This procedure advantageously provides an effective way of establishing an alternate signaling link, and preferably it can include means for a network to conduct authentication and establish a secure tunnel. In addition, it can include a mechanism provides an effective way of discovering if the access network supports the HRPD signaling over an alternate link, without having to inform the access network capability by explicit means, which could be time consuming and expensive.

As used herein, Access Network-AAA (AN-AAA) means Access Network-Authentication, Authorization & Accounting:

Authentication refers to the confirmation that a user who is requesting services is a valid user of the network services requested. Authentication is accomplished via the presentation of an identity and credentials. Examples of types of credentials are passwords, one-time tokens, digital certificates, and phone numbers (calling/called).

Authorization refers to the granting of specific types of service (including "no service") to a user, based on their authentication, what services they are requesting, and the current system state. Authorization may be based on restrictions, for example time-of-day restrictions, or physical location restrictions, or restrictions against multiple logins by the same user. Authorization determines the nature of the service which is granted to a user. Examples of types of service include, but are not limited to: IP address filtering, address assignment, route assignment, QoS/differential services, bandwidth control/traffic management, compulsory tunneling to a specific endpoint and encryption.

Accounting refers to the tracking of the consumption of network resources by users. This information may be used for management, planning, billing, or other purposes. Real-time accounting refers to accounting information that is delivered concurrently with the consumption of the resources. Batch accounting refers to accounting information that is saved until it is delivered at a later time. Typical information that is gathered in accounting is the identity of the user, the nature of the service delivered, when the service began and when it ended.

Figure 5:
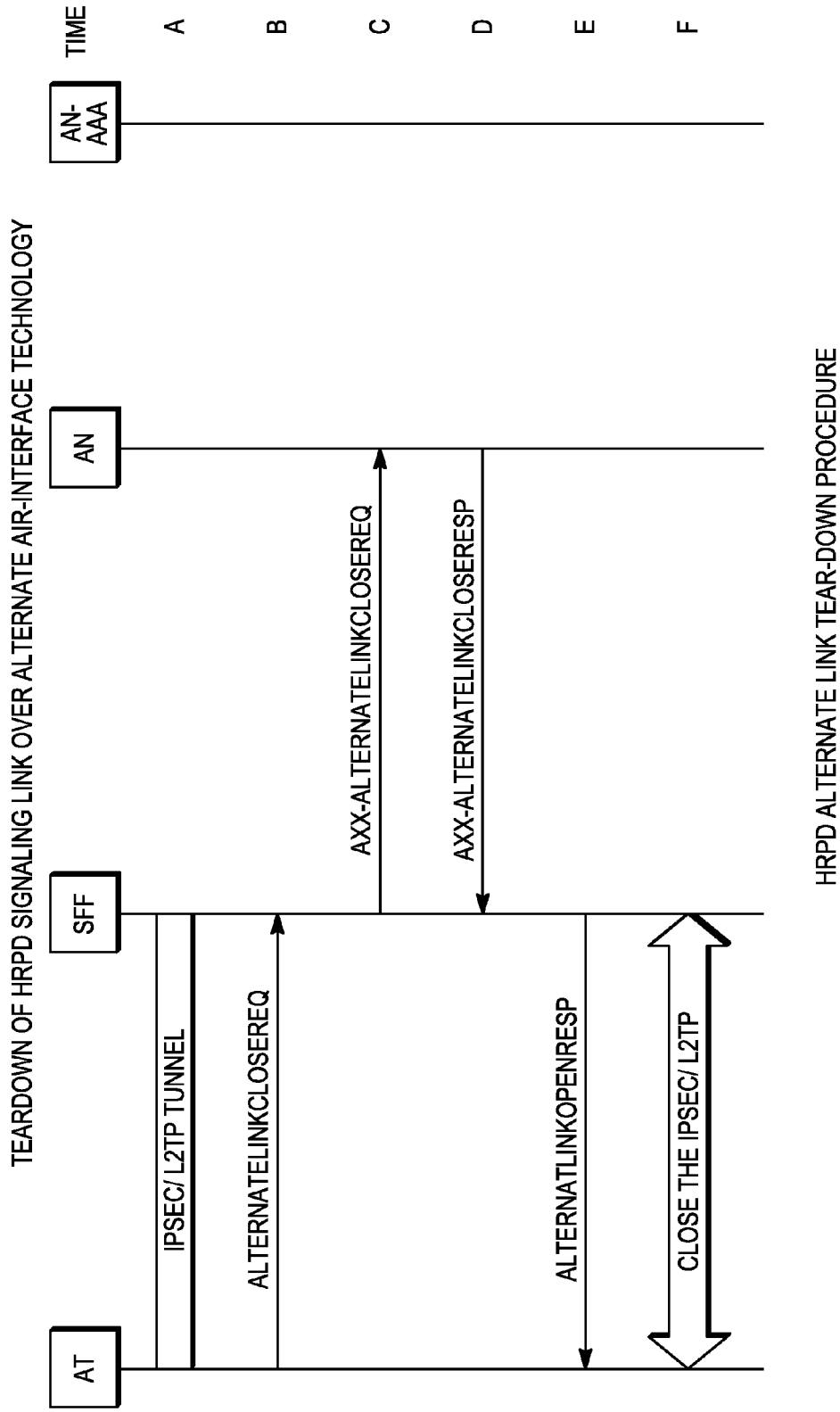
FIG. 5 is a flow diagram for closing (or turning off) an HRPD signal link over a non-HRPD access over time, the diagram includes columns for each of the Access Terminal (AT), Signal Forwarding Function (SFF), Access Network (AN), Access Network-AAA (AN-AAA) and times a-f, illustrating how a link is turned off or terminated, in accordance with the invention.

FIG. 5 is a flow diagram for closing (or turning off) an HRPD signal link over a non-HRPD air-interface over time, the diagram includes columns for each of the Access Terminal (AT), Signal Forwarding Function (SFF), Access Network (AN), Access Network-AAA (AN-AAA) and times a-f, illustrating how a link is turned off, accordance with the invention.

In a preferred embodiment and in more detail, at time a, the AT has already established a secure data tunnel between an Access Terminal and the Signal Forwarding Function (SFF). At time b, the AT sends AlternateLinkCloseReq messages to SFF, over the IP bearer. At time c, the Signal Forwarding Function, upon receiving the AlternateLinkCloseReq initiates a procedure to close the alternate link connection between the access terminal and the access network, and sends an Axx-AlternateLinkCloseReq message to the access network. At time d, the access network, responds back with Axx-AlternateLinkCloseResp message. At time e, the SFF completes the procedure to close the alternate link and sends AlternateLinkCloseResp to the access terminal. And, at time f, a secure data tunnel is closed between the access terminal and the SFF. As used herein, IP bearer refers to a data transport using TCP/IP as the mechanism for end-to-end transport protocol.

This provides a reliable procedure for closing or turning off the alternate signaling link between the HRPD access network and the access terminal over non-HRPD air-interfaces, ensuring the synchronization of a Signaling Adaptation state machine running on access terminal and the access network, in one embodiment.

Figure 6:
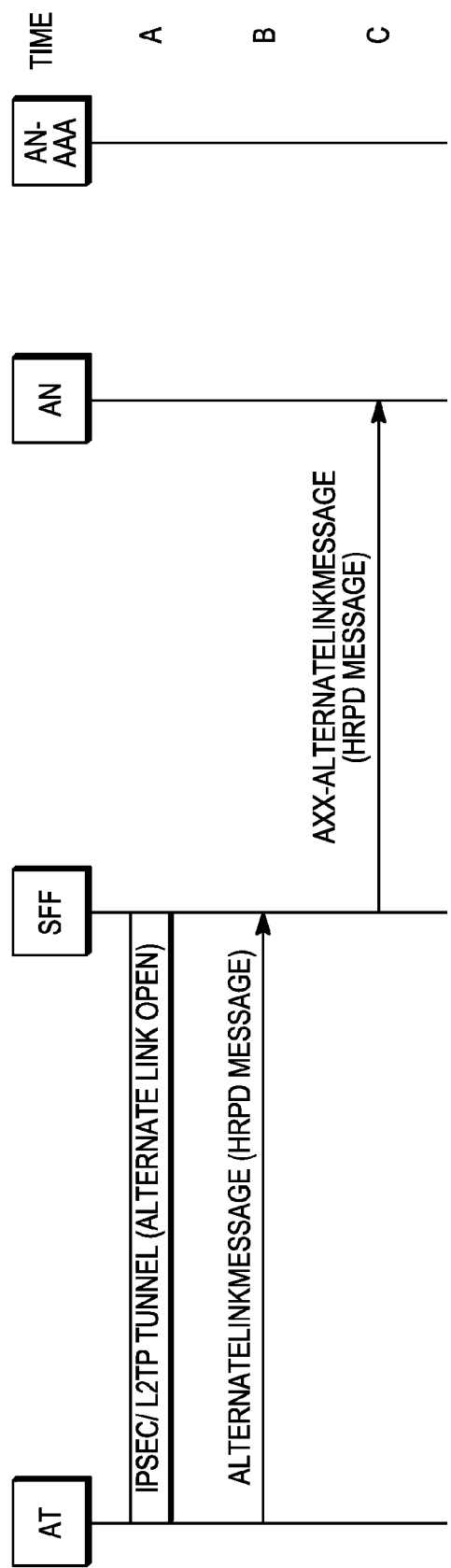
FIG. 6 is a flow diagram showing HRPD signaling exchanges over a non-HRPD access using TCP/IP over time, the diagram includes columns for each of the Access Terminal (AT), Signal Forwarding Function (SFF), Access Network (AN), Access Network-AAA (AN-AAA) and times a-c, in accordance with the invention.

FIG. 6 is a flow diagram showing HRPD signaling exchanges over a non-HRPD air-interface using TCP/IP over time, the diagram includes columns for each of the Access Terminal (AT), Signal Forwarding Function (SFF), Access Network (AN), Access Network-AAA (AN-AAA) and times a-c, accordance with the invention.

Figure 15:
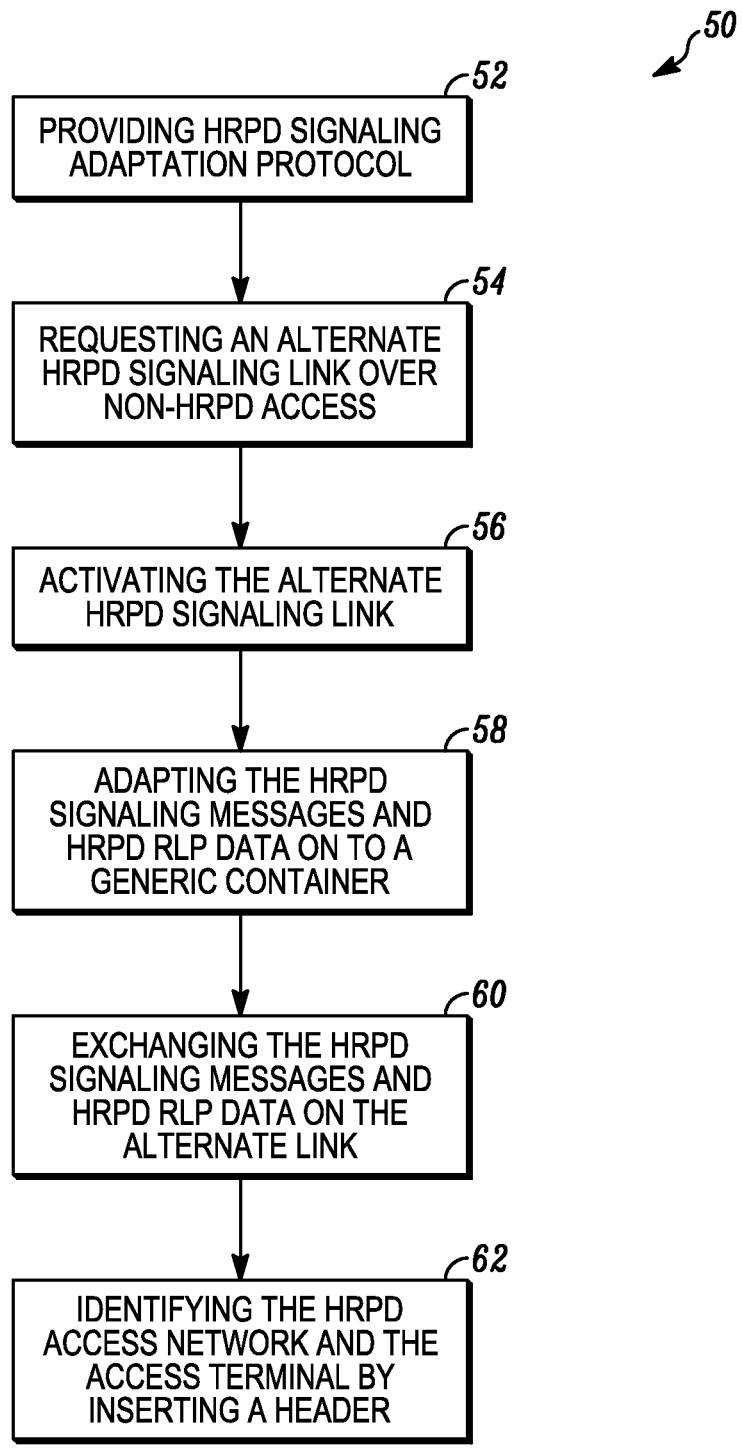
FIG. 15 is a block diagram of an embodiment of a signaling adaptation method for converting HRPD messages and HRPD data on to a generic container that can be transported over a non-HRPD access, in accordance with the invention.

In more detail and in a preferred embodiment, at time a, the AT has already established a secure data tunnel between Access Terminal and the Signal Forwarding Function (SFF). At time b, the AT sends AlternateLinkMessage messages to the SFF, over the IP bearer. The AlternateLinkMessage has an encapsulated HRPD signaling message, with the header information for the SFF to determine which Access Network this message should be forwarded to. And, at time c, the SFF, upon receiving the AlternateLinkMessage forwards the message to the appropriate access network. This provides a mechanism for exchanging the HRPD signaling messages and HRPD data transparently over non-HRPD access, without requiring the non-HRPD network to interpret and process the HRPD specific information Referring to FIG. 15, an alternate embodiment of a signaling adaptation method 50 for converting HRPD messages and HRPD data on to a generic container that can be transported over a non-HRPD access, is shown. The method 50, comprises the steps of: providing 52 a HRPD protocol including a Signal Adaptation Protocol (SAP) including an open state, set up state and a default closed state; requesting 54 an alternate HRPD signaling link over a non-HRPD access to be opened; activating 56 the alternate HRPD signaling link upon entering the open state; adapting 58 (and encapsulating) the HRPD signaling messages and HRPD Radio Link Protocol (RLP) data on to a non-HRPD access; exchanging 60 HRPD signaling messages and HRPD data between the access terminal and the HRPD access network via the alternate HRPD signaling link, free of establishing an HRPD traffic channel; and identifying 62 the HRPD access network and the access terminal over non-HRPD access by inserting a header comprising sector identification, stream identification and access terminal identification. The method performs an initiation and session establishment procedure, minimizes the time, disruption and packet loss during handoff to a HRPD access network and enables seamless mobility.

Advantageously, the method provides a mechanism or process for exchanging HRPD signaling messages and HRPD data over the dedicated radio connection of non-HRPD technology which reduces the cost of development of a multimode access terminal capable of performing active session handoff between non-HRPD wireless technology and HRPD cellular technology.

To provide context, to send or receive HRPD signaling messages according to known methods, such as in 3GPP2 C.S0024A, entitled "cdma2000 High Rate Packet Data Air Interface Specification", September 2006, a dedicated radio connection needs to be established. The dedicated radio connection is defined as a particular state of the air-link in which the AT is assigned a forward traffic channel, a reverse traffic channel and associated medium access control channels. In a multimode mobile device, wherein a HRPD wireless technology and a non-HRPD wireless technology is implemented, and when a non-HRPD is on a dedicated radio connection, it is expensive and redundant to have the HRPD technology also be on a dedicated radio connection simultaneously.

In order for a multimode access terminal with one technology such as HRPD to perform active session handoff (where in active session means, the access terminal is sending and receiving user data on a dedicated radio connection) from non-HRPD wireless technology to HRPD wireless technology, it is required per 3GPP2 C.S0024A, that an HRPD session be established, which includes HRPD signaling messages and HRPD data is exchanged on a dedicated radio connection between an access terminal and HRPD access network. However, having two dedicated radio connections would be expensive in implementation and technologically complicated.

This method 50 provides a cost effective method and mechanism for exchanging HRPD signaling messages and HRPD data over a dedicated non-HRPD radio connection, which reduces the cost of development of a multimode access terminal capable of performing active session handoff between non-HRPD wireless technology and HRPD technology.

In a preferred embodiment, the method 50 can further include providing pre-establishment of an HRPD session, HRPD point-to-point (PPP) and HRPD internet protocol (IP) session over a non-HRPD access, free of establishing an HRPD traffic channel. In order for a multimode access terminal with one technology such as HRPD to perform active session handoff from non-HRPD wireless technology to HRPD wireless technology, it is required under 3GPP2 C.S0024A, that an HRPD session, PPP session and an IP session be established, which includes HRPD signaling messages and HRPD data be exchanged on a dedicated radio connection between an access terminal and a HRPD access network. In a multimode mobile device, wherein HRPD wireless technology and a non-HRPD wireless technology is implemented and when a non-HRPD is on a dedicated radio connection, it would be costly and technologically redundant and use valuable air time to have the HRPD technology also be on the dedicated radio connection simultaneously. This pre-establishing feature allows a multimode access terminal the capability of performing active session handoff between non-HRPD wireless technology and HRPD cellular technology.

In yet another preferred embodiment, the method 50 includes performing traffic establishment free of a HRPD access channel procedure. This advantageously provides a means of transmitting HRPD access channel messages over the alternate link on a non-HRPD network, thus bypassing access channel procedures of HRPD to obtain a traffic channel.

As context, current implementations, such as the HRPD 3GPP2 C.S0024A standard, requires access channel procedures, such as exchanging access channel messages, which introduce additional time in the active session handoff from non-HRPD to HRPD. Generally, access channel messages are sent in order to obtain a traffic channel assignment for a dedicated radio connection between a HRPD access network and an access terminal.

To reduce the time it takes to perform active session handoff from a non-HRPD network to a HRPD network, in a preferred embodiment, the access channel messages are sent free of performing access procedures, thus effectively bypassing such procedures. This provides an effective handoff and an improvement to the user experience during handoff.

Figure 12:
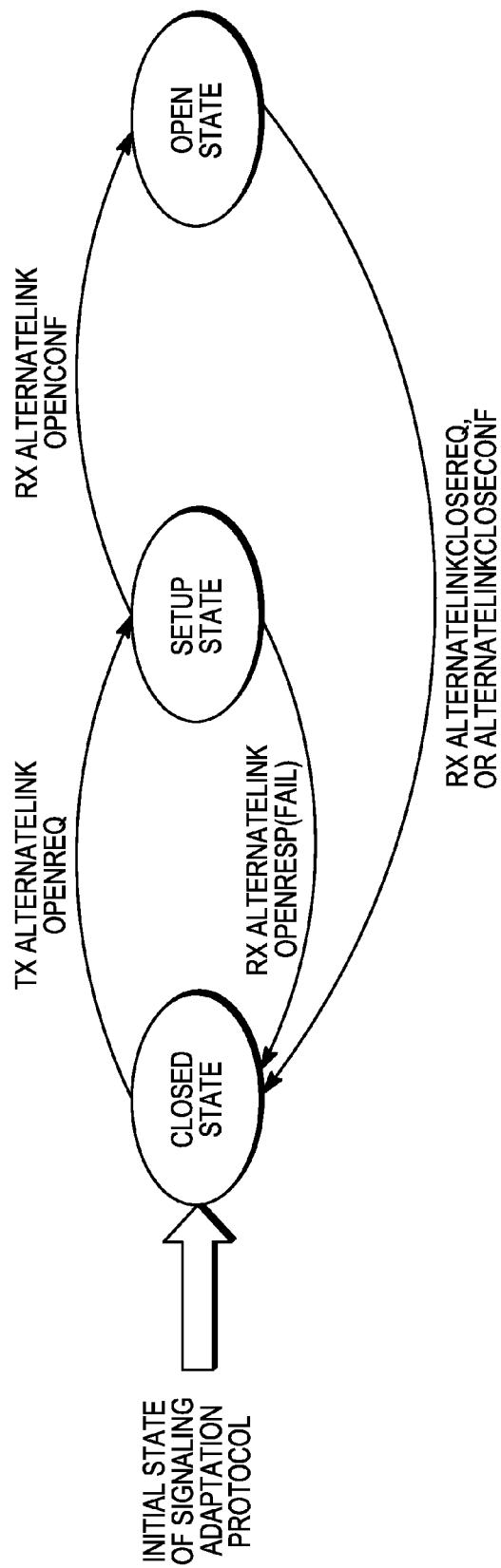
FIG. 12 shows an Access Terminal State Machine of the Signaling Adaptation Protocol, in FIG. 8 including a Closed State, Setup State and Open State, illustrating how an alternate link is opened and closed, in accordance with the invention.
Figure 13:
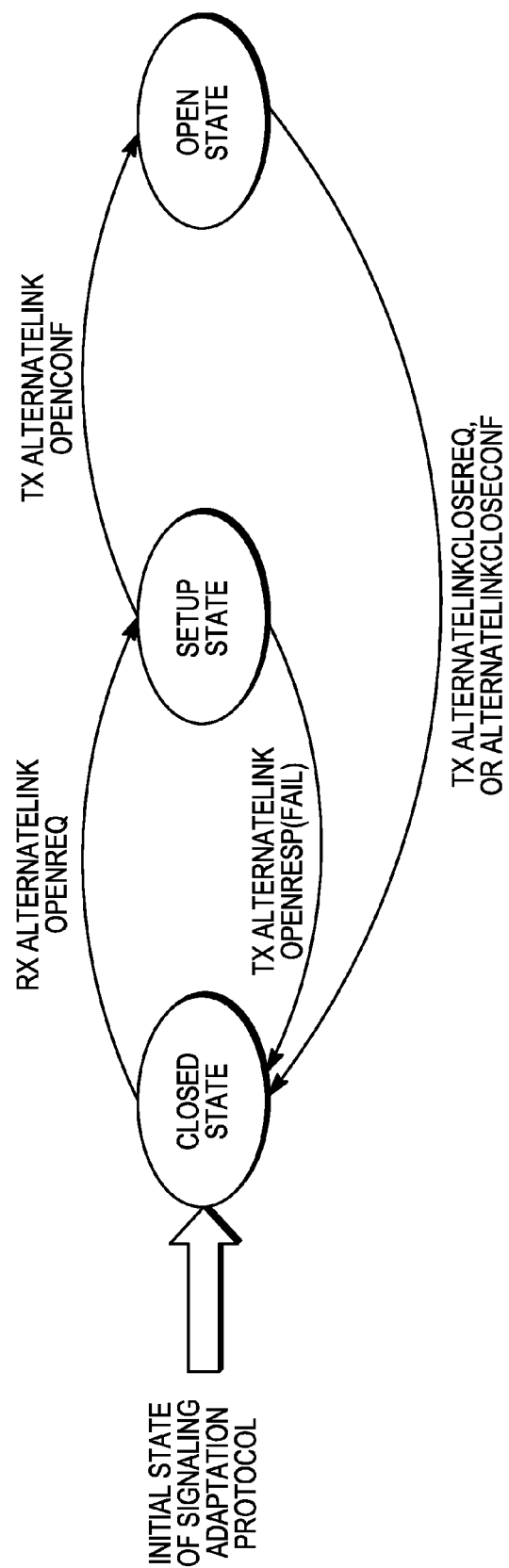
FIG. 13 shows an Access Network State Machine of the Signaling Adaptation Protocol, in FIG. 8 including a Closed State, Setup State and Open State, illustrating how an alternate link is opened and closed, in accordance with the invention.
Figure 14:
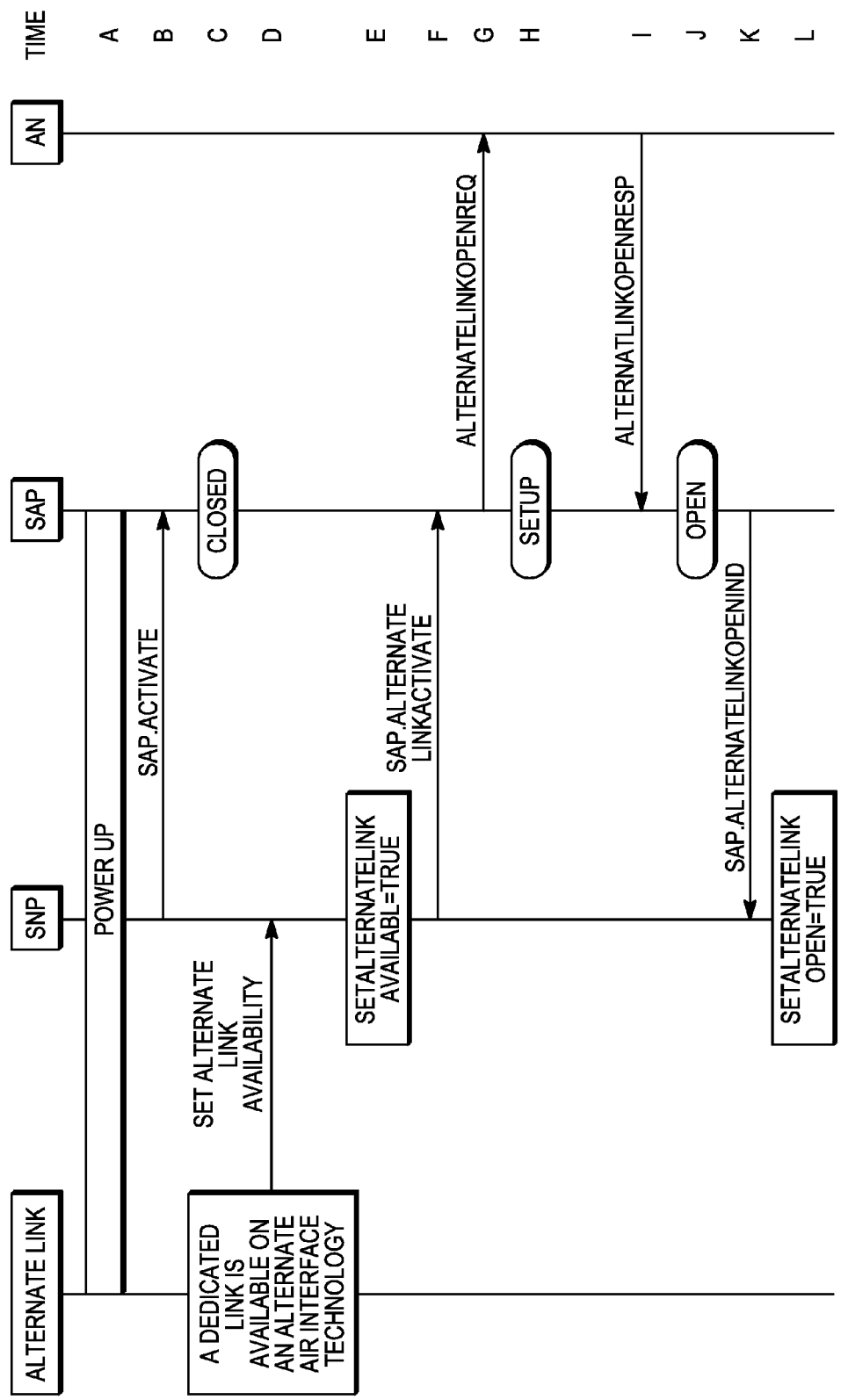
FIG. 14 is a flow diagram for establishing an HRPD signal link over a non-HRPD air-interface over time, the diagram includes columns for each of the Alternate Link, Signaling Network Protocol (SNP), Signaling Adaptation Protocol (SAP), Access Network (AN), and times a-l, in accordance with the invention.

In yet another embodiment, the method 50 can include providing an alternate link open request message including an identity of the access terminal and the connection is an IP connection, as shown in FIGS. 12-14. This feature provides an beneficial procedure where an identity of the access terminal is sent in an Alternate Link Open Request message, such that the access network can validate the credentials of the access terminal and optionally perform authentication and validation procedures in order to ensure a secure communication link between the access terminal and the access network over a non HRPD network.

Figure 7A:
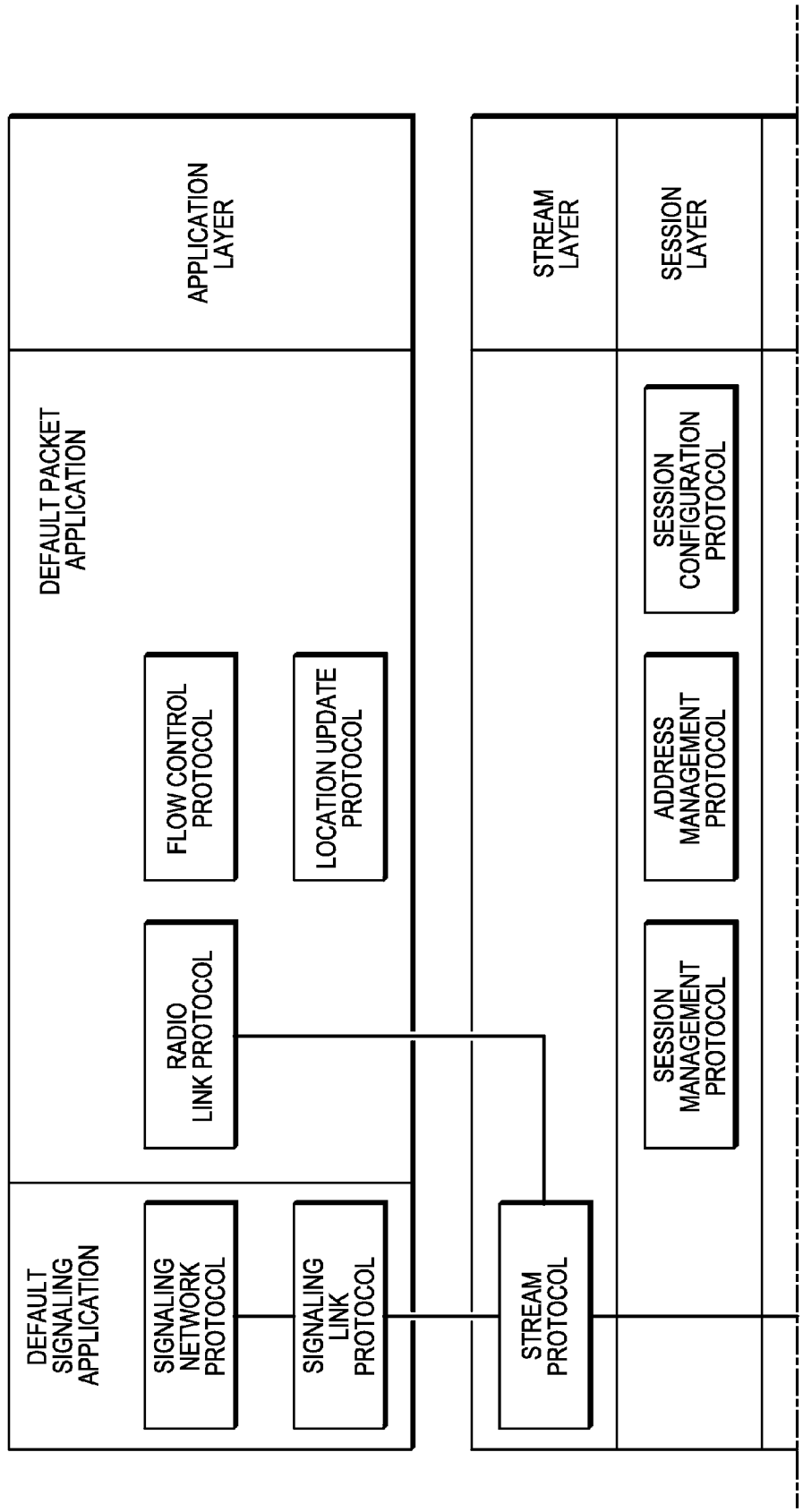
FIG. 7 is an illustration of a Protocol Structure as defined by HRPD Standard IS856, illustrating a default signaling path and a default data path, as detailed herein.
Figure 7B:
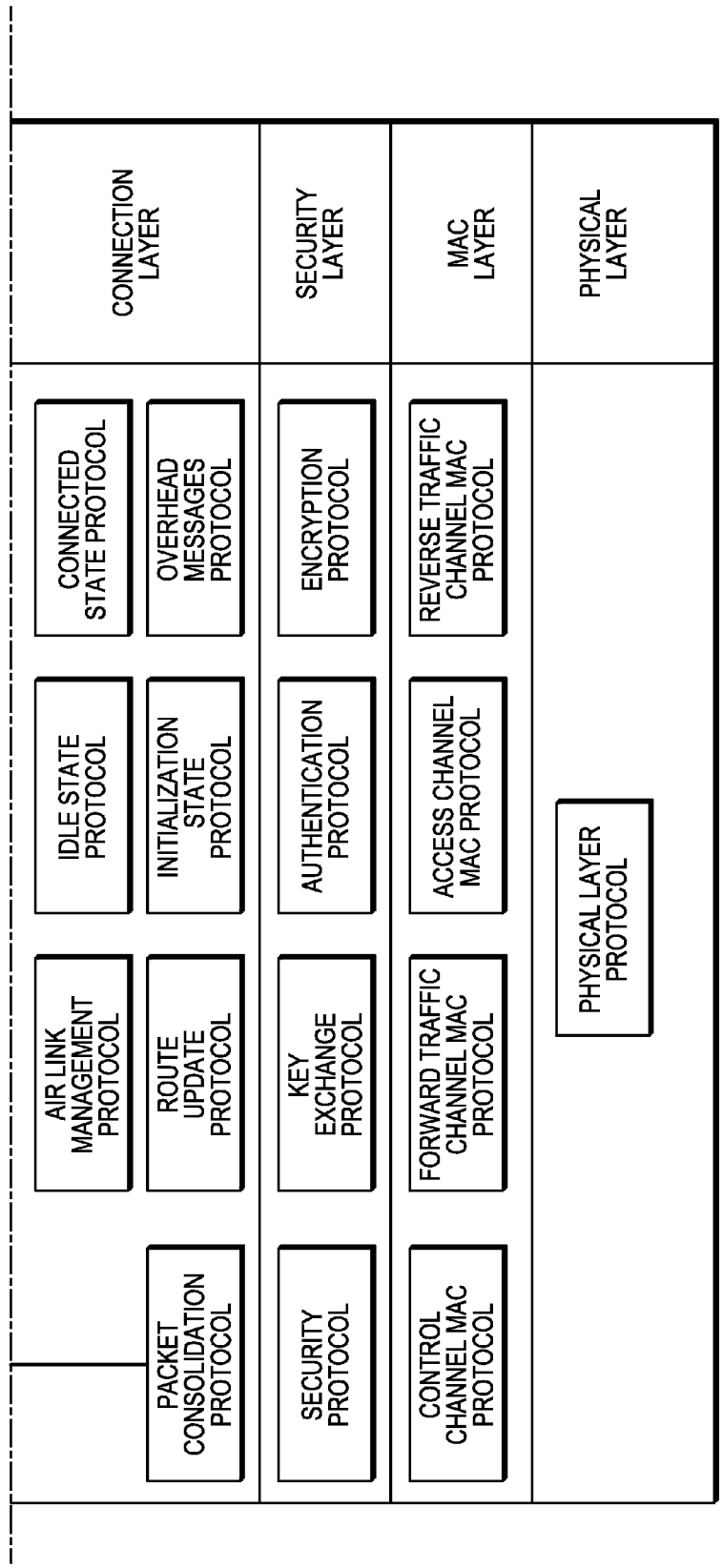

FIG. 7 is an illustration of a Protocol Structure as defined by HRPD Standard IS856, which is hereby incorporated herein by reference. It also shows a default signaling path, as detailed herein. The figure shows an HRPD layered architecture with a modular design that allows partial updates to protocols, software and independent protocol negotiation.

Detailed below is a general discussion of the protocol stack layers shown in FIG. 7. Starting at the bottom right and moving up, the Physical Layer provides the channel structure, frequency, power output, modulation, and encoding specifications for the Forward and Reverse link channels and provides protocols to support the procedure. The Medium Access Control (MAC) layer defines the protocol to support procedures that are used to receive and transmit over the Physical Layer. The Security Layer provides protocols to support authentication and encryption services. The Connection Layer provides protocols to support air link connection establishment and maintenance services. The Session Layer provides protocols to support protocol negotiation, protocol configuration, and session state maintenance services. The Stream Layer provides protocols to support multiplexing of distinct application streams. The Application Layer provides application protocols to support the Default Signaling Application for transporting HRPD protocol messages and the Default Packet Application for transporting user data. For more detail, refer to the HRPD Standard IS856.

Figure 8A:
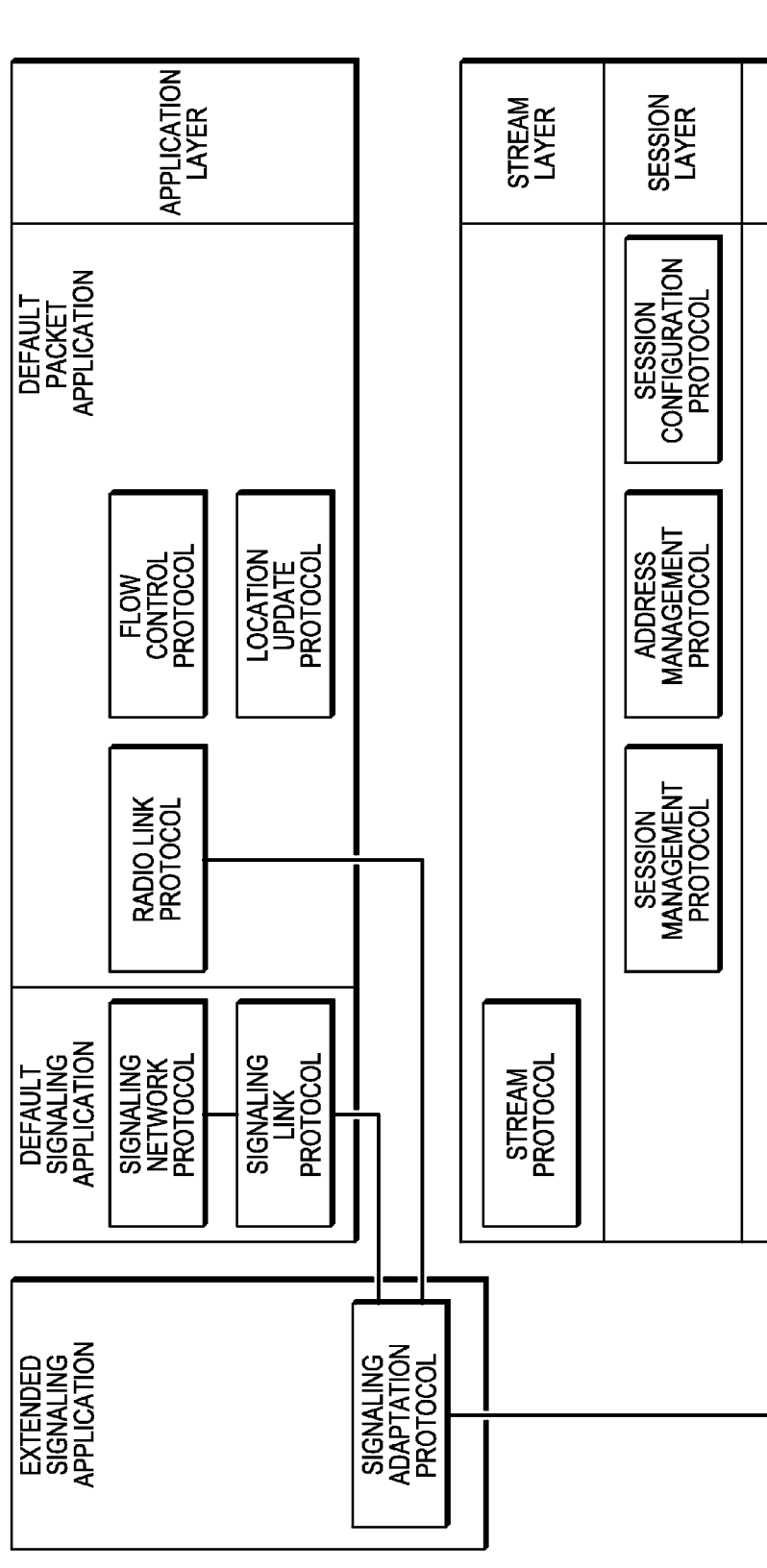
FIG. 8 is an environmental illustration showing the Protocol Structure as defined by HRPD Standard IS856, in FIG. 7, including a Signaling Adaptation Protocol (SAP) and signaling path in an opened (operational) position, in accordance with the invention.
Figure 8B:
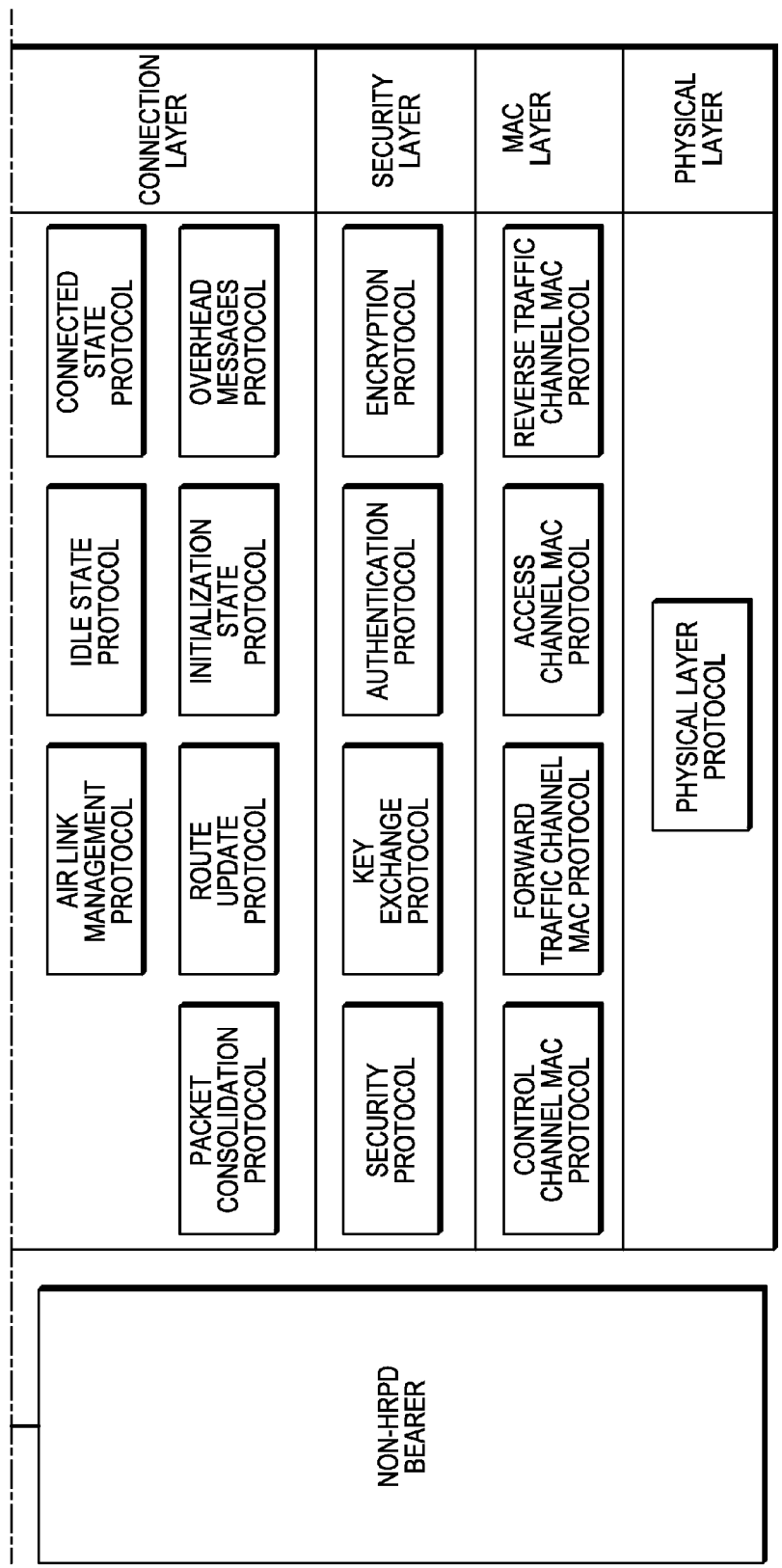

FIG. 8 is an environmental illustration showing the Protocol Structure as defined by HRPD Standard IS856, in FIG. 7, including a Signaling Adaptation Protocol (SAP) and signaling path in an opened (operational) position, in accordance with the invention. The SAP provides FIGS. 9, 10 and 11 show three embodiments of the Signaling Adaptation Protocol in FIG. 8 and exemplary signaling paths in an opened (operational) state.

Figure 9:
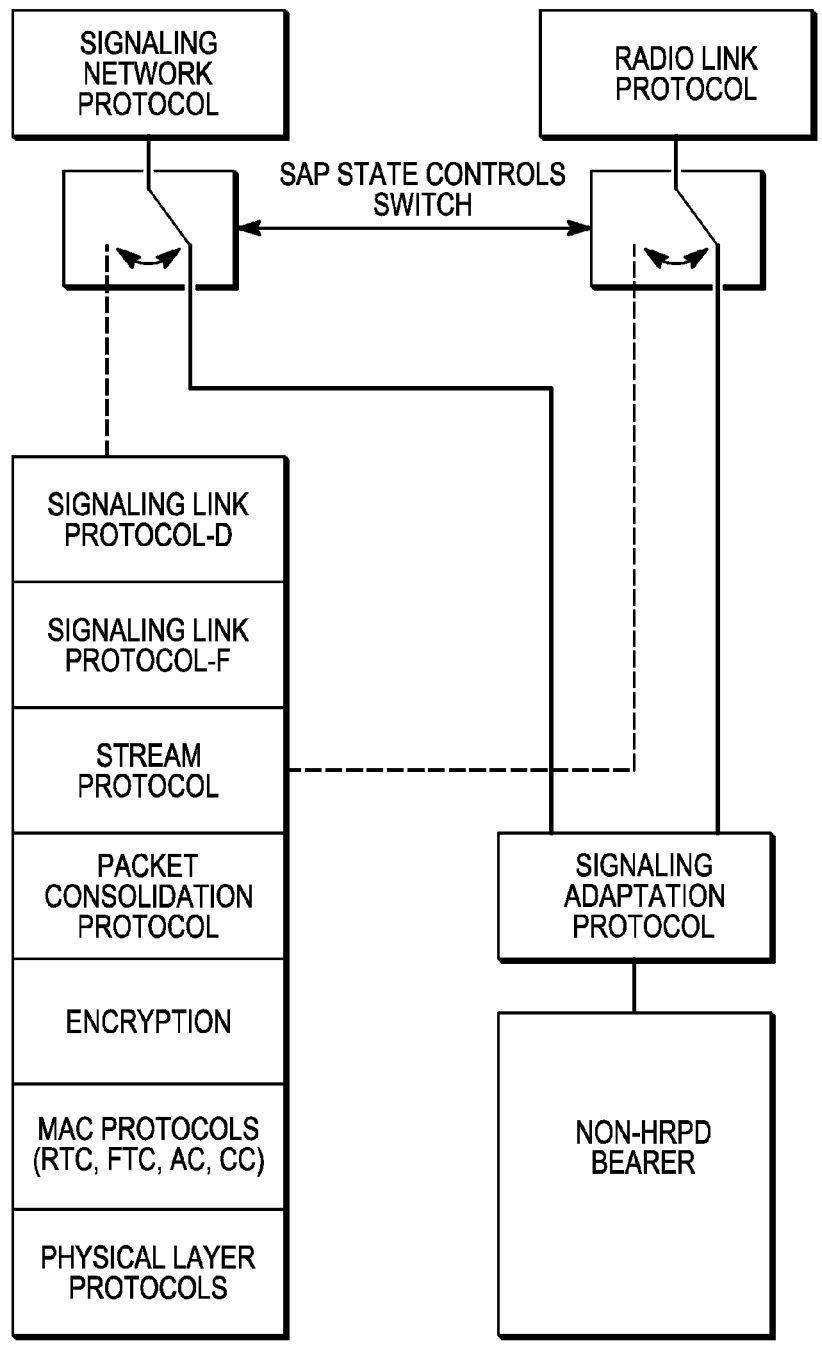
FIG. 9 is an embodiment of the Signaling Adaptation Protocol in FIG. 8 and exemplary signaling path in an opened state (operational), in accordance with the invention.

In one embodiment, the SNP protocol messages and the RLP packets are forwarded to the SAP, shown in the solid line signaling paths in FIG. 9.

In order perform HRPD session establishment, free of establishing the dedicated radio communication between HRPD access network and a multimode access terminal, for example, this method advantageously provides a procedure for forwarding the signaling messages generated by all of the seven layers of the HRPD protocol stack to the Signaling Adaptation Protocol through the Signaling Network Protocol (SNP). Thus, by forwarding: 1.) the HRPD signaling messages generated by all the layers of HRPD to the Signaling Adaptation Protocol from the SNP (left solid line signal path in FIG. 9); and 2.) the HRPD data that is generated or passed through by the Radio Link Protocol (RLP) to the Signaling Adaptation Protocol (through the right signaling path in FIG. 9), this minimizes the technical impact on known implementations, such as the IS-56A HRPD standard. In addition, In FIGS. 9 and 10, a SAP state controlling a switch is shown, as a double-pole like switch, which provides two software connected switches, to allow a signal to follow the default path (in phantom, closed state) or operational state following the solid line signaling paths.

Figure 10:
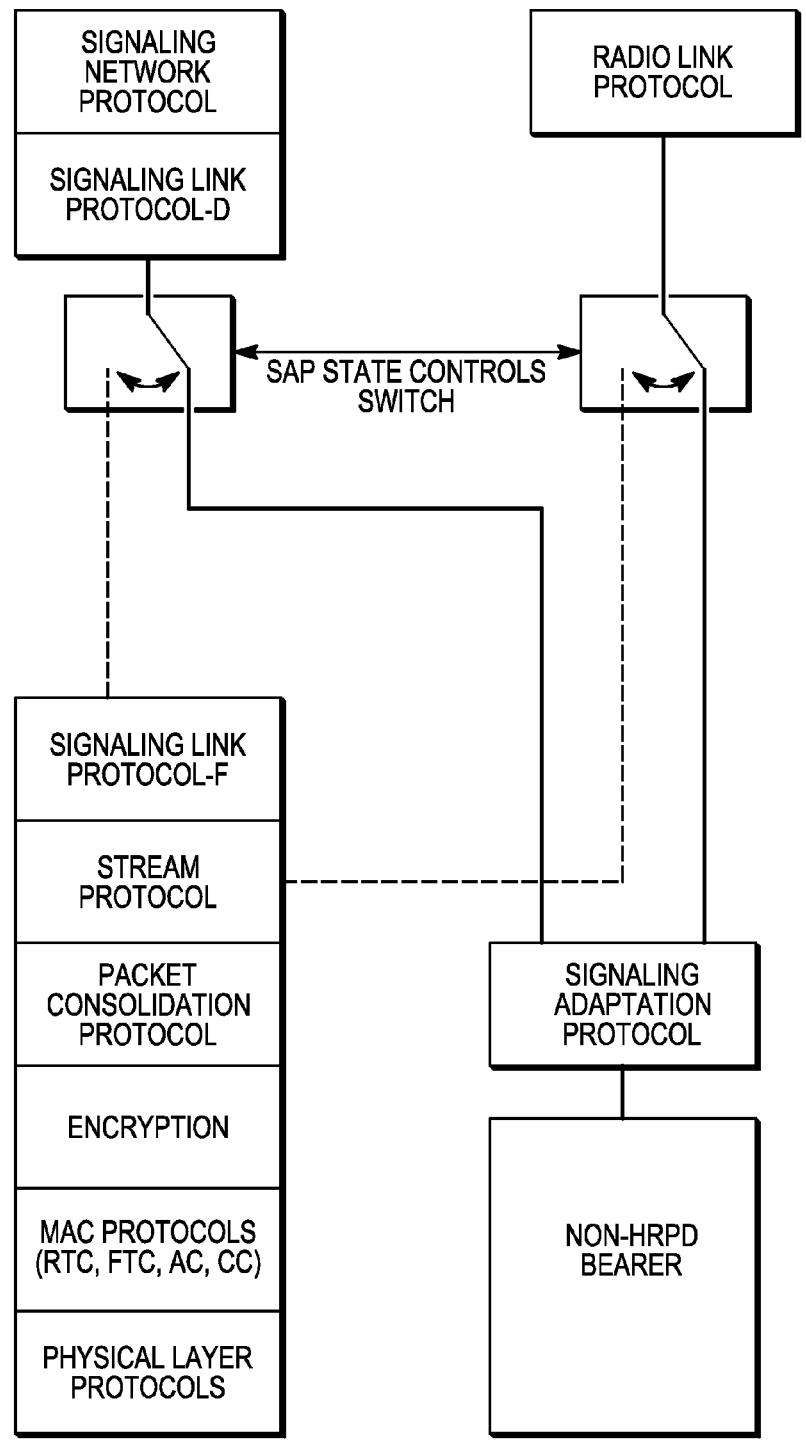
FIG. 10 is an alternate second embodiment of the Signaling Adaptation Protocol in FIG. 8 and exemplary signaling path in an opened state (operational), in accordance with the invention.
Figure 11:
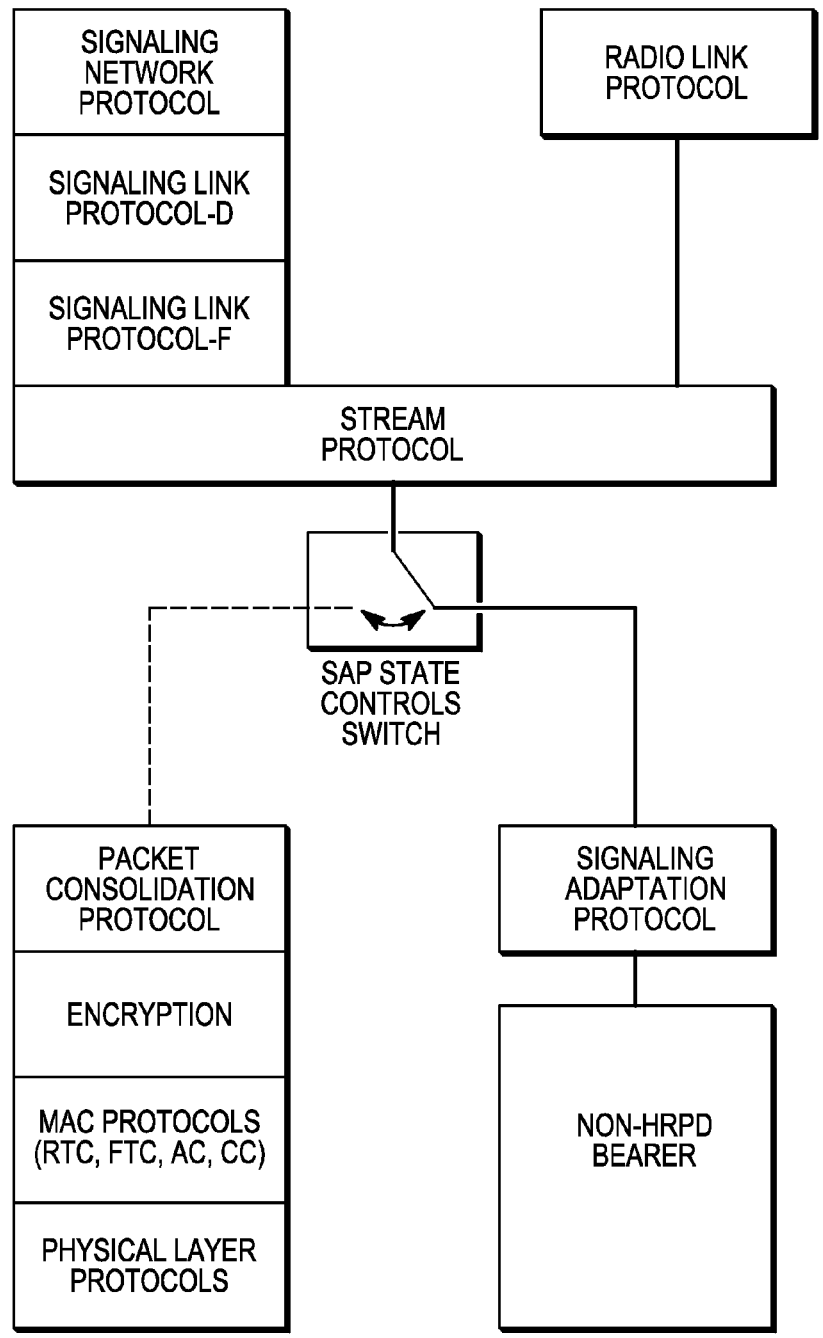
FIG. 11 is an alternate third embodiment of the Signaling Adaptation Protocol in FIG. 8 and exemplary signaling path in an opened state (operational), in accordance with the invention.

In a second embodiment, as shown in FIG. 10, the Signaling Link Protocol-D (SLP-D) protocol messages and the RLP packets are forwarded to the SAP. In order perform HRPD session establishment, free of establishing the dedicated radio communication between HRPD access network and a multimode access terminal, this method advantageously provides a procedure for forwarding the signaling messages generated by all of the seven layers of the HRPD protocol stack to the Signaling Adaptation Protocol through the Signaling Network Protocol (SNP) and Signaling Link Protocol (SLP-D). By forwarding the HRPD signaling messages generated by all the layers of HRPD to the Signaling Adaptation Protocol, by the SLP, this frees the SAP to perform sequencing and retransmission of the signaling messages, and hence simplifies the Signaling Adaptation Protocol procedures. In addition, HRPD data that is generated or passed through by the Radio Link Protocol (RLP) is forwarded to the Signaling Adaptation Protocol.

In a third embodiment, as shown in FIG. 11, packets of stream protocol are forwarded to the SAP. In order to perform HRPD session establishment, free of establishing the dedicated radio communication between HRPD access network and a multimode access terminal, this method advantageously provides a procedure for forwarding the signaling messages generated by all of the seven layers of the HRPD protocol stack to the Signaling Adaptation Protocol through the Signaling Network Protocol (SNP) and Signaling Link Protocol (SLP-D) and the steam protocol. By forwarding the HRPD signaling messages generated by all the layers of HRPD to the Signaling Adaptation Protocol, by the stream protocol, frees the SAP to perform sequencing and retransmission of the signaling messages as well as the inclusion and interpretation of stream identifier, which further simplifies the Signaling Adaptation Protocol procedures. In addition, HRPD data that is generated or passed through by the Radio Link Protocol (RLP) is forwarded to the Signaling Adaptation Protocol through the stream protocol further simplifies the development of Signaling Adaptation Protocol.

FIGS. 12 and 13 show Access Terminal and Access Network State Machines of the Signaling Adaptation Protocol, in FIG. 9 including a Closed State, Setup State and Open State, illustrating how an alternate link is opened. The method advantageously provides a procedure to effectively transition from a non-HRPD alternate link to a default HRPD signaling link and vice versa. The state transition and the messages defined in this method ensure an effective way of synchronizing a HRPD network and a multimode access terminal. In addition, another benefit of this feature is it provides a mechanism to determine the support of Signaling Adaptation Protocol or the Alternate Link Support by the access network, free of explicit signaling, which reduces the usage of radio frequency resources of the HRPD and non-HRPD wireless system.

FIG. 14 is a flow diagram for establishing an HRPD signal link over a non-HRPD air-interface over time, the diagram includes columns for each of the Alternate Link, Signaling Network Protocol (SNP), Signaling Adaptation Protocol (SAP), Access Network (AN), and times a-l, in accordance with the invention.

In a preferred embodiment, the method 50 further includes providing a message sequence for requesting and activating the alternate link by the SAP. This feature advantageously provides a means to establish and adapt the HRPD signaling messages free of establishing a dedicated HRPD radio connection, in a cost effective manner. This method can also provide backward compatibility with HRPD access networks and mobile devices that are already implemented and deployed, such as under the 3GPP2-C.S0024A standard.

In more detail, the flow diagram depicts the dynamic behavior of Signaling Adaptation Protocol in the context of other protocols already defined in the HRPD standard, C.S0024A. At time a, a mobile device powers up, At time b, a Signaling Network Protocol Activates the Signaling Adaptation Protocol. At time c, Signaling Adaptation Protocol initializes its local variables and enters a closed state. At time d, when a dedicated channel is available on an alternate link, SNP is informed about it. At time e, the SNP sets the availability on an alternate link to true. At time f, the SNP detects the need to send signaling messages to a network. It activates the signaling over Alternate Link by sending, SAP.AlternateLinkActivate. At time g, the SAP sends AlternateLinkOpenReq message to the network. At time h, the SAP enters a setup state and updates the appropriate variables. At time i, the Network sends an AlternateLinkOpenResp message, after it sets-up the signaling link over the alternate link. This can involve secure data-tunnel setup, etc. At time j, the SAP enters an open state and sets appropriate variables. At time k, the SAP sends SAP.AlternateLinkOpenInd indication to the SNP. And at time l, the SNP sets AlternateLinkOpen status to true.

It should be understood that the inventive concepts disclosed herein are capable of many modifications. To the extent such modifications fall within the scope of the appended claims and their equivalents, they are intended to be covered by this patent application.

We claim:

1. A signaling adaptation method for converting high rate packet data (HRPD) messages and HRPD data on to a generic container that can be transported over a non-HRPD access, comprising:
   providing a HRPD protocol including a Signal Adaptation Protocol (SAP) including an open state, set up state and a default closed state;
   requesting an alternate HRPD signaling link over a non-HRPD access to be opened;
   activating the alternate HRPD signaling link upon entering the open state;
   adapting the HRPD signaling messages and HRPD Radio Link Protocol (RLP) data on to a non-HRPD access;
   exchanging HRPD signaling messages and HRPD data between an access terminal and an HRPD access network via the alternate HRPD signaling link, free of establishing an HRPD traffic channel; and
   identifying the HRPD access network and the access terminal over non-HRPD access by inserting a header comprising sector identification and access terminal identification,
   wherein the alternate link is a data tunnel and the non-HRPD access is defined as at least one of a non-HRPD air interface, a non-HRPD access network and a non-HRPD core network.

2. The method of claim 1, further comprising at least one of: forwarding Signaling Network Protocol (SNP) protocol messages and RLP packets to the SAP; forwarding Signaling Link Protocol-D (SLP-D) protocol messages and RLP packets to the SAP; and forwarding packets of stream protocol to the SAP.

3. The method of claim 1, further comprising providing state machines for at least one of the access terminal and access network.

4. The method of claim 1, further comprising providing a message sequence for requesting and activating the alternate HRPD signaling link by the SAP.

5. The method of claim 1, further comprising pre-establishing an HRPD session, HRPD point-to-point (PPP) and HRPD internet protocol (IP) session over non-HRPD access, free of establishing an HRPD traffic channel, the non-HRPD access being defined as at least one of a non-HRPD air interface, a non-HRPD access network and a non-HRPD core network.

6. The method of claim 1, further comprising performing traffic establishment free of HRPD access channel procedure.

7. The method of claim 1, further comprising providing an alternate link open request message including an identity of the access terminal and the connection is an IP connection.

8. A signaling adaptation method for converting high rate packet data (HRPD) messages and HRPD data on to a generic container that can be transported over a non-HRPD access, comprising:

provinding a HRPD protocol including a Signal Adaptation Protocol (SAP) including an open state, set up state and a default closed state;

requesting an alternate HRPD signaling link over a non-HRPD access to be opened;

activating the alternate HRPD signaling link upon entering the open state;

adapting or encapsulating the HRPD signaling messages and HRPD Radio Link Protocol (RLP) data on to a non-HRPD access, the non-HRPD access being defined as at least one of a non-HRPD air interface, a non-HRPD access network and a non-HRPD core network;

exchanging HRPD signaling messages and HRPD data between an access terminal and an HRPD access network via the alternate HRPD signaling link, free of establishing an HRPD traffic channel;

identifying the HRPD access network and the access terminal over non-HRPD access by inserting a header comprising sector identification and access terminal identification;

providing at least one state machine for the access terminal and access network; and providing a message sequence for requesting and activating the alternate HRPD signaling link by the SAP.

9. The method of claim 8, further comprising forwarding Signaling Network Protocol (SNP) protocol messages and RLP packets to the SAP.

10. The method of claim 8, further comprising at least one of: forwarding SNP protocol messages and RLP packets to the SAP; forwarding Signaling Link Protocol-D (SLP-D) protocol messages and the RLP packets to the SAP; and forwarding packets of stream protocol to the SAP.

11. The method of claim 8, further comprising pre-establishing an HRPD session, HRPD point-to-point (PPP) and HRPD internet protocol (IP) session over non-HRPD access, free of establishing an HRPD traffic channel.

\* \* \* \* \*